(12) United States Patent
Johnson

(10) Patent No.: US 10,112,662 B2
(45) Date of Patent: Oct. 30, 2018

(54) TRACK ROLLER FRAME ASSEMBLY FOR TRACK TYPE MACHINES

(71) Applicant: Caterpillar SARL, Geneva (CH)

(72) Inventor: Peter J Johnson, Cary, NC (US)

(73) Assignee: Caterpillar SARL, Geneva (CH)

( * ) Notice: Subject to any disclaimer, the term of this patent is extended or adjusted under 35 U.S.C. 154(b) by 164 days.

(21) Appl. No.: 15/236,719

(22) Filed: Aug. 15, 2016

(65) Prior Publication Data

US 2018/0043948 A1 Feb. 15, 2018

(51) Int. Cl.
| | | |
|---|---|---|
| *B62D 55/10* | (2006.01) | |
| *B62D 55/30* | (2006.01) | |
| *B62D 55/15* | (2006.01) | |
| *E02F 3/34* | (2006.01) | |
| *B62D 55/06* | (2006.01) | |

(52) U.S. Cl.
CPC ............ *B62D 55/10* (2013.01); *B62D 55/15* (2013.01); *B62D 55/30* (2013.01); *B62D 55/06* (2013.01); *E02F 3/3414* (2013.01)

(58) Field of Classification Search
CPC ...... B62D 55/096; B62D 55/10; B62D 55/30; F16B 2/02; A44B 19/30; A44B 19/303
USPC ........................................ 248/560, 602, 603
See application file for complete search history.

(56) References Cited

U.S. PATENT DOCUMENTS

| | | | |
|---|---|---|---|
| 3,313,368 A | 4/1967 | Carter et al. | |
| 3,750,779 A | 8/1973 | Huseman | |
| 3,915,509 A * | 10/1975 | Bell | B62D 55/30 305/147 |
| 4,191,431 A | 3/1980 | Roley et al. | |
| 4,230,199 A * | 10/1980 | Stedman | B62D 49/04 172/136 |
| 4,323,283 A | 4/1982 | Muramoto et al. | |
| 4,406,501 A * | 9/1983 | Christensen | B62D 55/08 305/125 |
| 4,881,786 A | 11/1989 | Tonsor | |
| 5,191,951 A | 3/1993 | Bargfrede et al. | |
| 6,305,763 B1 * | 10/2001 | Oertley | B62D 55/30 305/144 |
| 6,408,965 B1 | 6/2002 | Grant | |
| 6,832,659 B1 * | 12/2004 | Bares | B62D 55/084 180/19.1 |
| 8,061,698 B2 * | 11/2011 | Palinkas | F16F 1/54 105/199.1 |
| 8,430,188 B2 * | 4/2013 | Hansen | B62D 55/04 180/9.26 |
| 2005/0150699 A1 * | 7/2005 | Mukaino | B62D 55/10 180/9.52 |

(Continued)

*Primary Examiner* — Joseph M Rocca
*Assistant Examiner* — Daniel S Yeagley

(57) ABSTRACT

A track roller frame assembly for a track type machine is disclosed. The track roller frame assembly includes a first track roller frame and a second track roller frame. The first track roller frame is slidably received in the second track roller frame. The second track roller includes an outer surface and an opening. The track roller frame assembly further includes an assembly for adjusting a gap between the first track roller frame and the second track roller frame. The assembly includes a first plate coupled to the outer surface of the second track roller frame. The assembly further includes a resilient pad extending through the opening of the second track roller frame and abutting the first plate and the first track roller frame.

15 Claims, 7 Drawing Sheets

(56) References Cited

U.S. PATENT DOCUMENTS

2015/0211594 A1 7/2015 Parizek et al.
2018/0057083 A1* 3/2018 France .................. B62D 55/32

* cited by examiner

TRACK ROLLER FRAME ASSEMBLY FOR TRACK TYPE MACHINES

TECHNICAL FIELD

The present disclosure relates to a track roller frame assembly for a track type machine, and more particularly to an assembly for adjusting a gap between a first track roller frame and a second track roller frame of a track roller frame assembly.

BACKGROUND

Track type machines typically include a track on each side of the machine for propelling the machine. Each track may include an endless belt supported on a plurality of rollers, one or more idler wheels, and a driven sprocket. A track roller frame assembly is generally provided to support the rollers, idler wheels, and driven sprocket. The track roller frame assembly may have a telescopic arrangement that includes a front track roller frame slidably received within a rear track roller frame. The front track roller frame may be extended or retracted to adjust tension of the endless belt, such as by a hydraulic cylinder.

A gap may exist between the front track roller frame and the rear track roller frame. A relatively small gap between the front and rear track roller frames enables a smooth extension or retraction of the front track roller frame. However, a relatively large gap may cause tilting of the front track roller frame relative to the rear track roller frame during machine travel. Such tilting may increase wear of the front and rear track roller frames, which in turn may increase the gap between the front and rear track roller.

U.S. Pat. No. 6,408,965 discloses a machine with a track having a slide member slidably received within a receiving tube. The slide member is slidably supported within the receiving tube by a pair of resilient rubber bushings. However, the resilient rubber bushings may wear as the machine travels. The wear of resilient rubber bushings may cause an increase of a gap between the slide member and the receiving tube.

SUMMARY OF THE INVENTION

Various aspects of the present disclosure discloses a track roller frame assembly for a track type machine. The track roller frame assembly includes a first track roller frame and a second track roller frame. The first track roller frame is slidably received in the second track roller frame. The second track roller includes an outer surface and an opening. The track roller frame assembly further includes an assembly for adjusting a gap between the first track roller frame and the second track roller frame. The assembly includes a first plate coupled to the outer surface of the second track roller frame. The assembly further includes a resilient pad extending through the opening of the second track roller frame and abutting the first plate and the first track roller frame.

Various aspects of the present disclosure discloses a track type machine. The track type machine includes a main frame and an undercarriage. The undercarriage is coupled to the main frame and includes a track roller frame assembly. The track roller frame assembly includes a first track roller and a second track roller frame. The first track roller frame is slidably received in the second track roller frame. The second track roller frame includes an outer surface and an opening. The track roller frame assembly further includes an assembly for adjusting a gap between the first track roller frame and the second track roller frame. The assembly includes a first plate coupled to the outer surface of the second track roller frame. The assembly further includes a resilient pad extending through the opening of the second track roller frame and contacting the first track roller frame and the first plate.

Various aspects of the present disclosure discloses a track roller frame assembly for a track type machine. The track roller frame assembly includes a first track roller frame and a second track roller frame. The first track roller frame is slidably received in the second track roller frame. The second track roller frame includes an outer surface and an opening. The track roller frame assembly further includes an assembly for adjusting a gap between the first track roller frame and the second track roller frame. The assembly includes a first plate, a resilient pad, a second plate, and one or more shims. The first plate is coupled to the outer surface of the second track roller frame. The resilient pad extends through the opening of the second track roller frame and abuts the first plate and the first track roller frame. Further, the second plate disposed between the outer surface of the second track roller frame and the first plate and the one or more shims arranged between the first plate and the second plate. Furthermore, a combined thickness of the shims arranged between the first plate and the second plate is varied to adjust the gap between the first track roller frame and the second track roller frame.

DETAILED DESCRIPTION

Reference will now be made in detail to specific embodiments or features, examples of which are illustrated in the accompanying drawings. Generally, corresponding reference numbers will be used throughout the drawings to refer to the same or corresponding parts. Also, wherever possible, the same reference numbers will be used throughout the drawings to refer to the same or the like parts.

Figure 1:
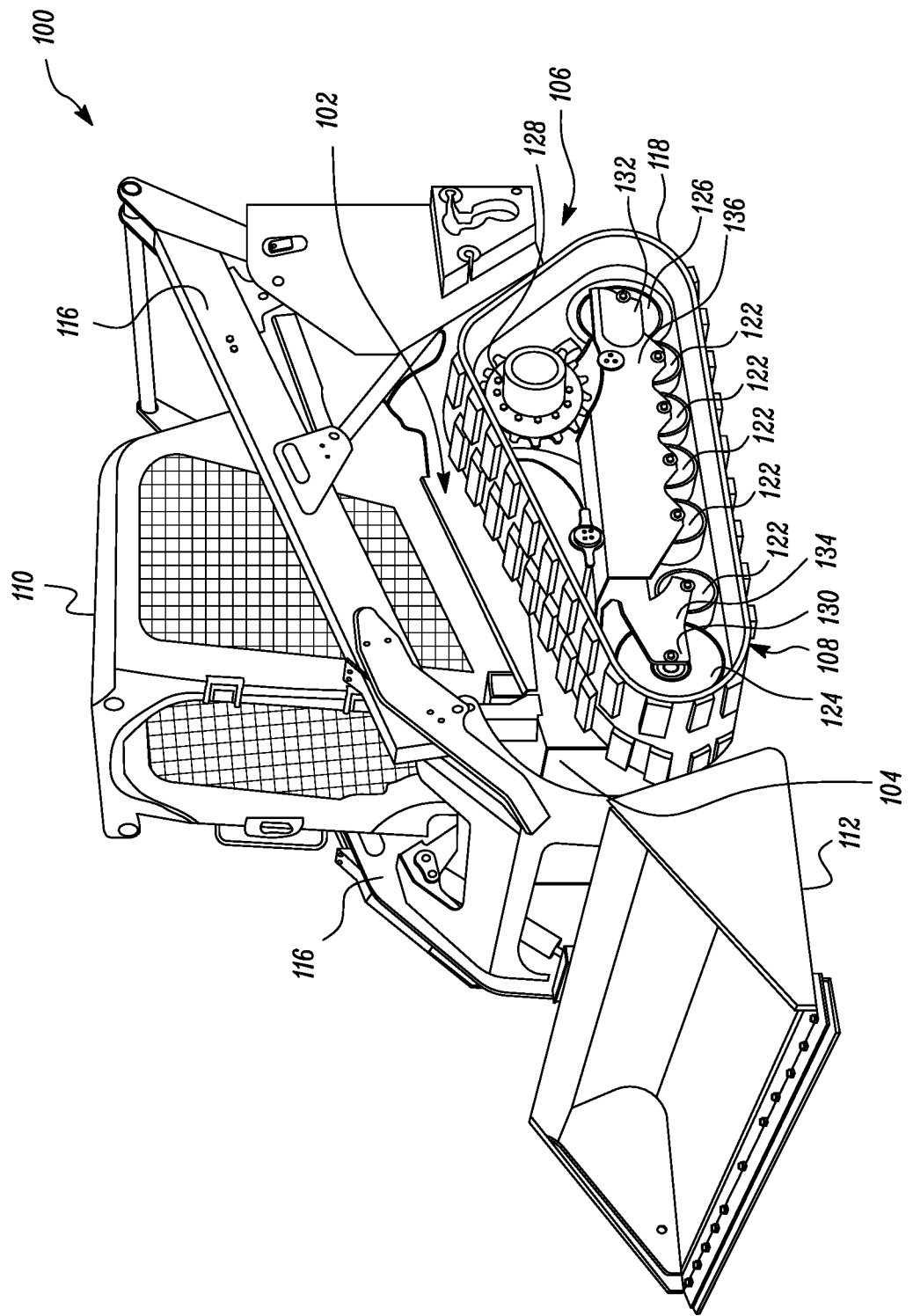
FIG. 1 illustrates a perspective view of a track type machine including a track.
Figure 2:
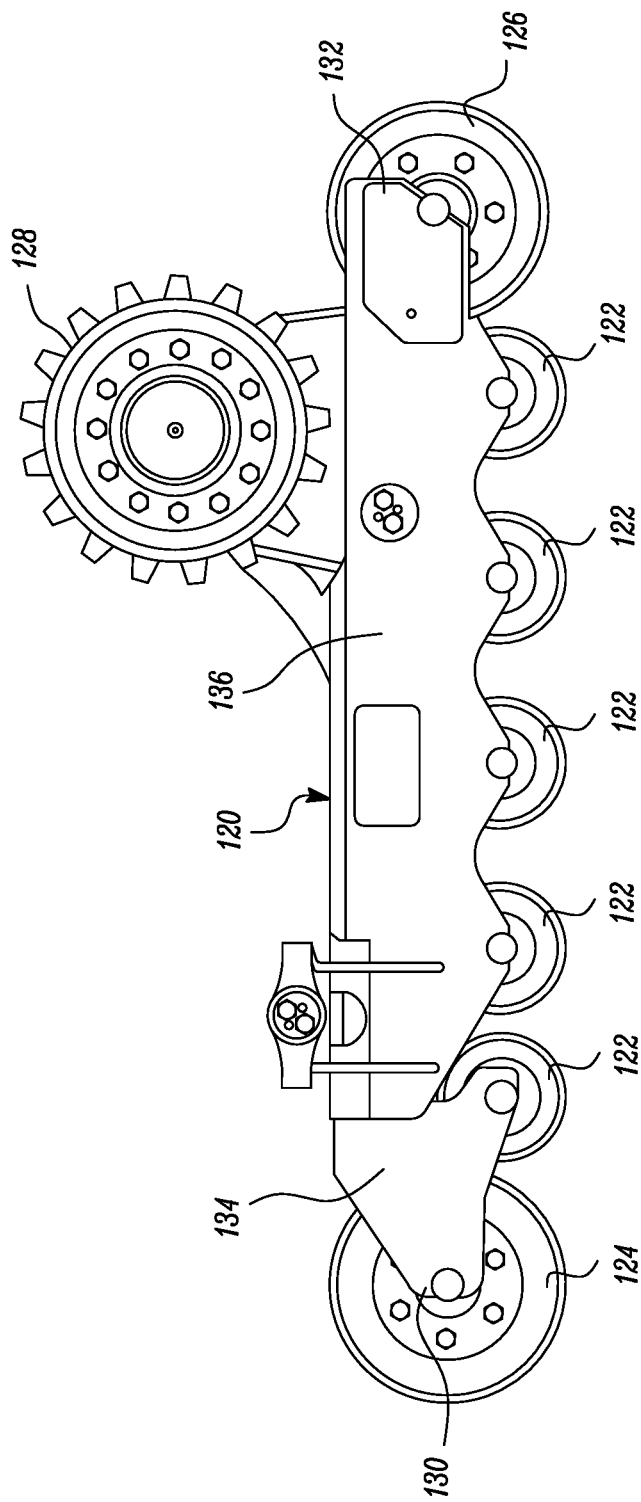
FIG. 2 illustrates a side view of the track including a track roller frame assembly from which an endless belt is removed.

Referring to FIG. 1, an exemplary track type machine 100 is shown. The track type machine 100 may be a track type tractor, an excavator, a shovel, a compact track loader (shown in FIG. 1). In an embodiment, the track type machine 100 may be a construction machine, a mining machine, an earthmoving machine, an agricultural machine or any other machine known in the art. The track type machine 100 includes an engine 102, a main frame 104, an undercarriage 106 including a pair of tracks 108 on each side of the track type machine 100, a cab 110, and an implement 112.

The engine 102 is a power source of the track type machine 100. The engine 102 powers a movement of the track type machine 100 over a ground. The main frame 104 accommodates and supports the engine 102, the undercarriage 106, the cab 110, and the implement 112. Multiple other known components and structures may be supported by the main frame 104 as well. The main frame 104 plays an important role in integrating and connecting various co-related structural and functions aspects of the track type machine 100. The main frame 104 is supported relative to the ground by the undercarriage 106. Further, the main frame 104 may include a plurality of brackets to couple the cab 110 and the implement 112.

The cab 110 is supported on the main frame 104 and may include an operator station having one or more control levers, a display, and/or any other input devices. An operator may control various components or systems of the track type machine 100 by operating one or more control levers or input devices. The control levers may include joysticks, foot pedals, levers, or any other similar devices known in the art. The input devices may include touchpad, computer keyboard, touch panel etc.

As shown in FIG. 1, the implement 112 may be coupled to of the main frame 104 by one or more linkage arms 116. The implement 112 may be a bucket, a blade, a grapple, or any other implement, known in the art. The implement 112 may be raised or lowered to perform a useful work by operating the one or more linkage arms 116.

Further, each track 108 includes an endless belt 118, a track roller frame assembly 120, a plurality of rollers 122, a first idler wheel 124, a second idler wheel 126, and a sprocket 128. The endless belt 118 is arranged around the rollers 122 and the idler wheels 124, 126, and is driven by the sprocket 128. The first idler wheel 124, the second idler wheel 126, the rollers 122, and the sprocket 128, are supported by the track roller frame assembly 120. The first idler wheel 124 and the second idler wheel 126 are respectively connected to a front end 130 and a rear end 132 of the track roller frame assembly 120. The sprocket 128 is coupled near the rear end 132 of the track roller frame assembly 120 and is positioned in proximity to the second idler wheel 126. The rollers 122 are positioned between the first idler wheel 124 and the second idler wheel 126 to support the endless belt 118. Although two idler wheels are shown and contemplated, it may be appreciated that the second idler wheel 126 may be replaced with the sprocket 128 configured to drive the endless belt 118. Also, the above noted configuration is not limited to be the disclosed aspects alone, and a variety of other well-known arrangements of the track may be contemplated. For simplicity and ease in understanding only one of the tracks is discussed, it being understood that the discussion is equivalently applicable to the other of the pair of tracks (not shown) as well.

Figure 3:
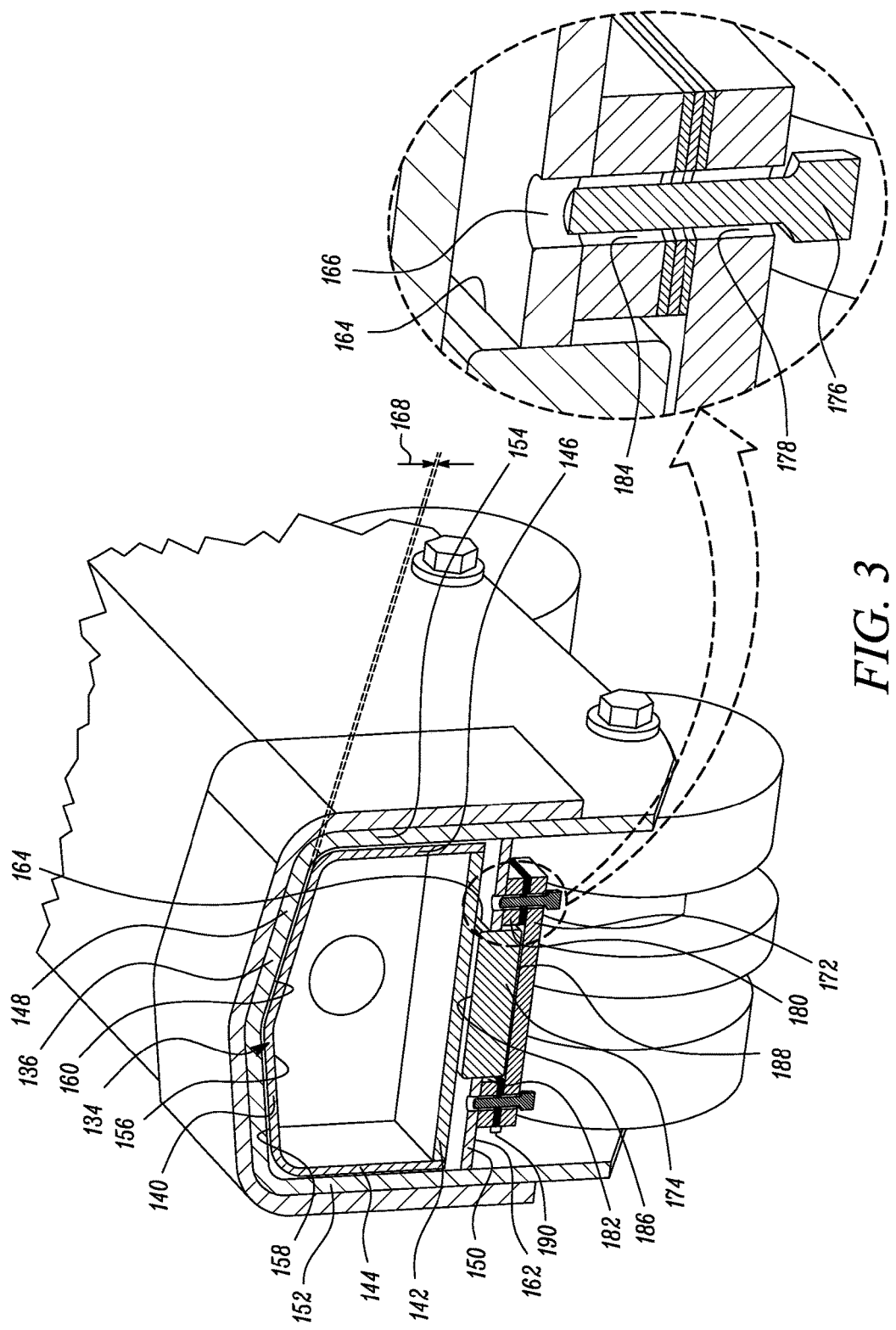
FIG. 3 illustrates a front sectional perspective view of the track roller frame assembly.
Figure 4:
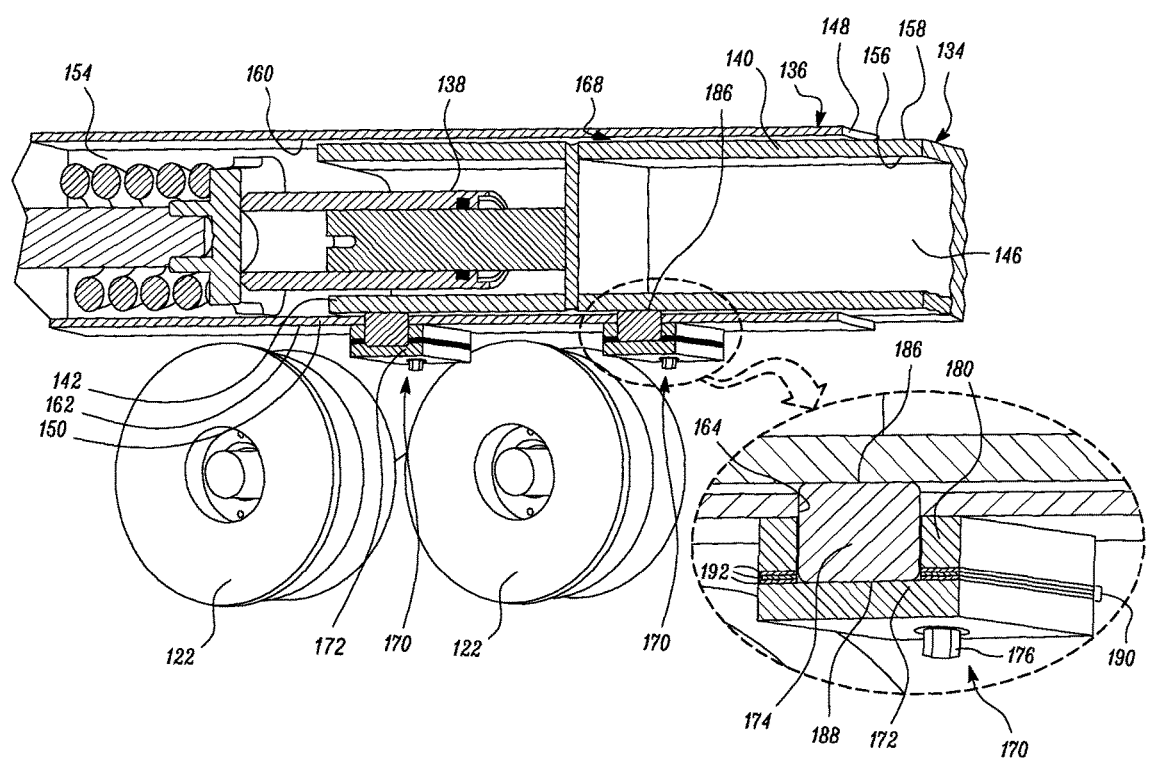
FIG. 4 illustrates a side sectional perspective view of the track roller frame assembly depicting a gap between a first track roller frame and a second track roller frame.
Figure 5:
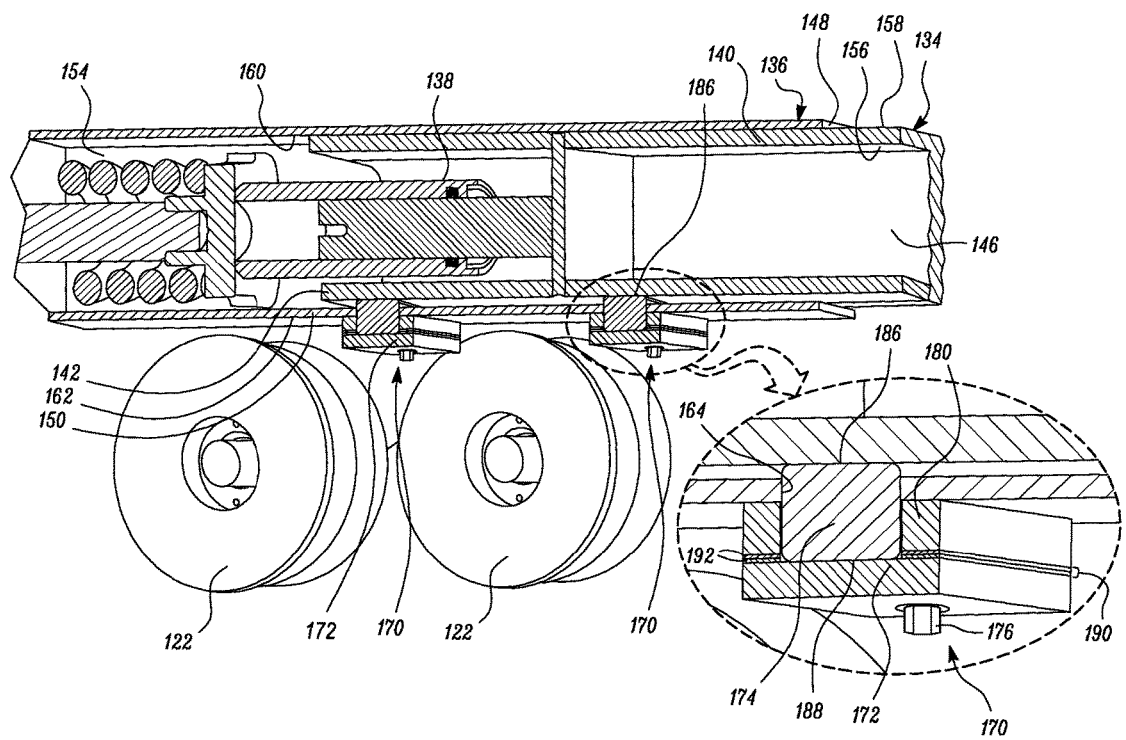
FIG. 5 illustrates a side sectional perspective view of the track roller frame assembly depicting a first track roller frame and a second track roller frame.
Figure 6:
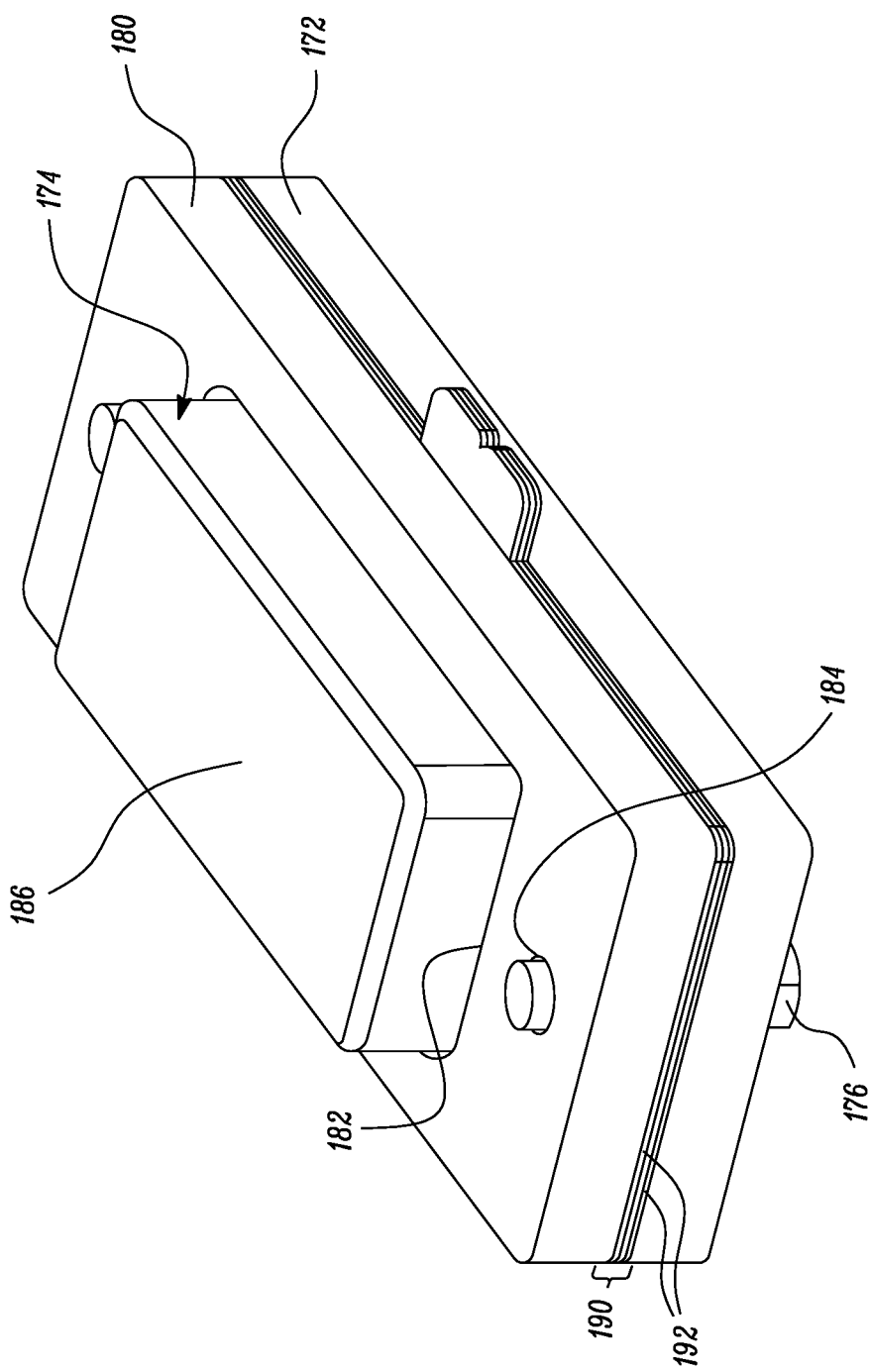
FIG. 6 illustrates a perspective view of an assembly of the track roller frame assembly.

Referring to FIGS. 3, 4, and 5, the track roller frame assembly 120 includes a first track roller frame 134 and a second track roller frame 136. The first track roller frame 134 is slidably received within the second track roller frame 136, giving the track roller frame assembly 120 a telescopic type of arrangement. The first track roller frame 134 is coupled to the front idler wheel 124 and the second track roller frame 134 is coupled to the second idler wheel 126. The first track roller frame 134 may be extended or retracted relative to the second track roller frame 136 by an actuator 138. In an embodiment, the actuator 138 may be a fluid cylinder, embodying a conventional arrangement of a piston rod reciprocally arranged within a cylinder portion of the fluid cylinder. The piston rod may be coupled to the first track roller frame 134, while the cylinder portion may be coupled to the second track roller frame 136. The piston rod may reciprocate in and out of the cylinder to correspondingly retract and extend the first track roller frame 134 relative to the second roller track frame 136. By extending or retracting the first track roller frame 134 relative to the second track roller frame 136, a tension of the endless belt 118 may be adjusted.

The first track roller frame 134 and the second track roller frame 136 each include a tubular structure. In the illustrated embodiment, the first track roller frame 134 and the second track roller frame 136 include hollow rectangular cross-sections. The first track roller frame 134 includes an upper plate 140, a lower plate 142, and a pair of side plates 144, 146. Similarly, the second track roller frame 136 includes an upper plate 148, a lower plate 150, and a pair of side plates 152, 154. Although, rectangular cross-sections for the first track roller frame 134 and second track roller frame 136 are shown, any other suitable cross-sections known in the art could also be used.

Further, the first track roller frame 134 includes an inner surface 156 and an outer surface 158. The inner surface 156 and the outer surface 158 of the first track roller frame 134 are respectively formed by the inner surfaces and outer surfaces of the upper plate 140, the lower plate 142, and the pair of side plates 144, 146. Similarly, the second track roller frame 136 includes an inner surface 160 and an outer surface 162, respectively formed by the inner surfaces and outer surfaces of associated upper plate 148, lower plate 150, and pair of side plates 152, 154. The second track roller frame 136 includes an opening 164 and a pair of holes 166, which in the illustrated embodiment, are formed in the lower plate 150. The pair of holes 166 may include screw threads formed on an inner surface of each of the holes 166.

In an assembled position of the track roller frame assembly 120, the outer surface 158 of the first track roller frame 134 faces the inner surface 160 of the second track roller frame 136. Moreover, a gap 168 (shown in FIG. 4) may exist between the inner surface 160 of the second track roller frame 136 and the outer surface 158 of the first track roller frame 134.

Referring to FIGS. 3, 4, 5, 6, and 7, the track roller frame assembly 120 includes an assembly 170 for adjusting the gap 168 between the first track roller frame 134 and the second track roller frame 136. In particular, the assembly 170 provides for adjustment of the gap 168 between the inner surface 160 of the second track roller frame 136 and the outer surface 158 of the first track roller frame 134.

The assembly 170 generally includes a first plate 172 and a resilient pad 174. The first plate 172 is coupled to the outer surface 162 of the second track roller frame 136. In the illustrated embodiment, the first plate 172 is coupled to the lower plate 150 of the second track roller frame 136 by a plurality of fasteners 176. The first plate 172 includes a pair of holes 178 for receiving the fasteners 176 to couple the first plate 172 to the second track roller frame 136.

The assembly 170 may further include a second plate 180 arranged between the outer surface 162 of the second track roller frame 136 and the first plate 172. The second plate 180 may be coupled to both the first plate 172 and the outer surface 162 of the second track roller frame 136 by the plurality of fasteners 176. In an embodiment, the second plate 180 may be attached to the outer surface 162 of the second track roller frame 136 by welding. Alternatively, the second plate 180 may be integrally formed with the second track roller frame 136 or with the first plate 172. As shown in FIGS. 3, 4 and 5, the second plate 180 is arranged between the first plate 172 and the second track roller frame 136 such that the second plate 180 abuts the outer surface 162 of the second track roller frame 136. The second plate 180 also includes a centrally-located opening 182. The second plate 180 also includes a pair of holes 184 for receiving the fasteners 176 for coupling the second plate 180 to the first plate 172 and the second track roller frame 136.

The resilient pad 174 includes a first end surface 186 and a second end surface 188. In assembly, the resilient pad 174 extends through the opening 182 of the second plate 180 and the opening 164 formed in the second track roller frame 136 such that the first end surface 186 contacts the outer surface 158 of the first track roller frame 134, and the second end surface 188 contacts the first plate 172. The resilient pad 174 is arranged such that a portion of the resilient pad 174 extends between the first track roller frame 134 and the second track roller frame 136, and another portion of the resilient pad 174 is positioned between the second track roller frame 136 and the first plate 172. The portion of the resilient pad 174 extending between the first track roller frame 134 and the second track roller frame 136 is varied to adjust the gap 168 between the first track roller frame 134 and the second track roller frame 136.

Figure 7:
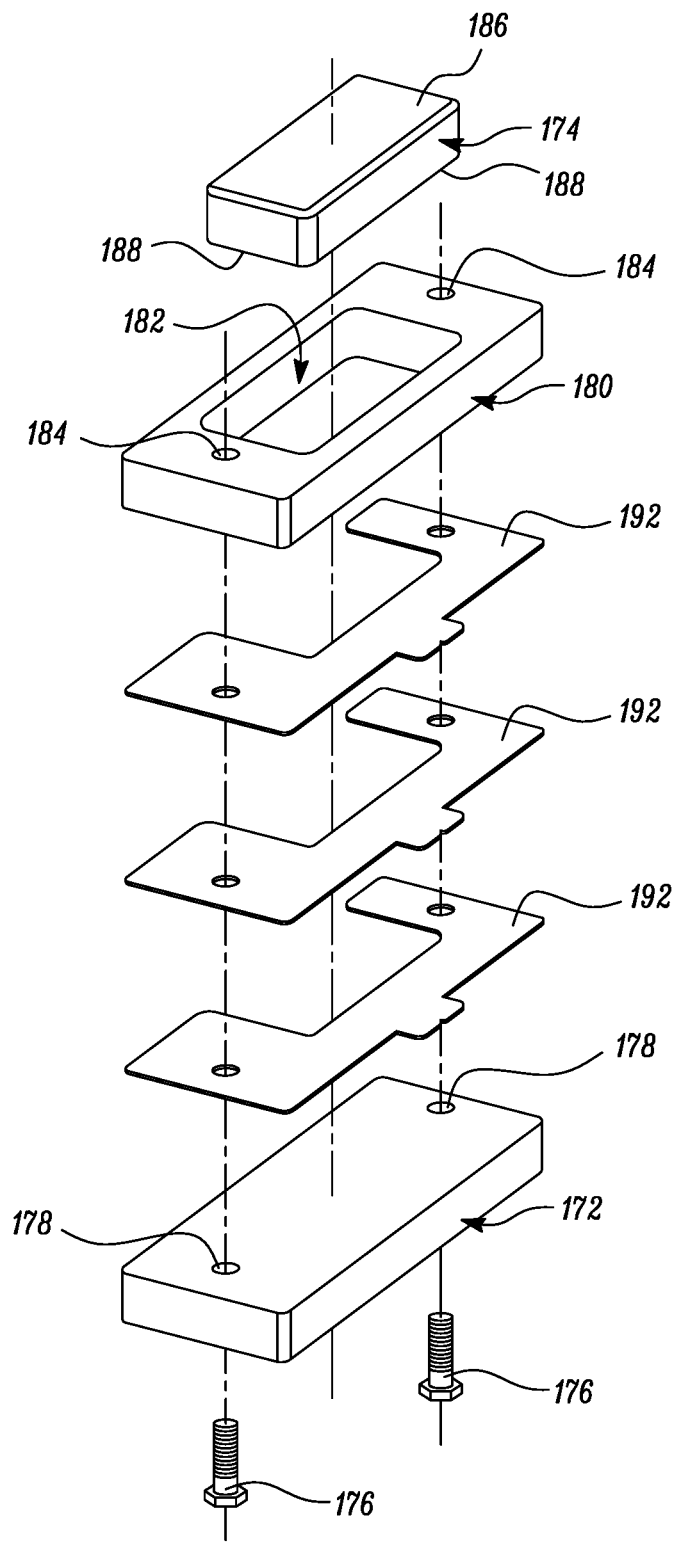
FIG. 7 illustrates an exploded view of the assembly of the track roller frame assembly.

The assembly 170 may further include a shim unit 190 having one or more shims 192. The shim unit 190 is positioned between the first plate 172 and the second plate 180. As shown in FIG. 7, the one or more shims 192 include U-shaped structures, but it will be appreciated that shims having other shapes may also be used. Each shim 192 defines a central hollow portion surrounded by shim walls. Each shim 192 may be arranged between the first plate 172 and the second plate 180, and surrounds the resilient pad 174. In an embodiment, shims, such as of a rectangular shape, may be arranged between the resilient pad 174 and the first plate 172. In such a case, dimensions of such shims corresponds to the dimensions of the resilient pad 174. first plate 172. In such a case, dimensions of such shims corresponds to the dimensions of the resilient pad 174.

A combined thickness of the shim unit 190 may be varied by changing a number of shims 192, so as to alter the gap 168 between the first track roller frame 134 and the second track roller frame 136. The combined thickness of the shim unit 190 refers to the summation of a thickness of each of the individual shims 192 of the shim unit 190. The combined thickness of the shim unit 190 may be reduced by decreasing the number of shims 192 arranged between the first plate 172 and the second plate 180. Similarly, the combined thickness of the shim unit 190 may be increased by increasing the number of shims 192 arranged between the first plate 172 and the second plate 180.

Alternatively, the combined thickness of the shim unit 190 may be varied by replacing one or more shims 192 arranged between the first plate 172 and the second plate 180 with one or more shims of different thickness. Therefore, the combined thickness of the shim unit 190 may be reduced by replacing the one or more shims 192 by one or more shims of reduced thickness. Similarly, the combined thickness of the shim unit 190 may be increased by replacing the one or more shims 192 by one or more shims of greater thickness.

In other embodiments, the second plate 180 may be omitted or integrally formed with the first plate 172. In such cases, the shim unit 190 may be arranged between the first plate 172 and the second track roller frame 136 such that the shim unit 190 contacts the outer surface 162 of the second track roller frame 136.

INDUSTRIAL APPLICABILITY

For assembling the assembly 170, the second plate 180 may be attached with the second track roller frame 136 such that the outer surface 162 of the second track roller frame 136 abuts the second plate 180. The second plate 180 may be attached to the second track roller frame 136 by any suitable means, such as welding, using the plurality of fasteners 176, or both. It may be appreciated that the second plate 180 may be welded with the outer surface 162 of the second track roller frame 136 before attaching the second plate 180 with the second track roller frame 136 with fasteners 176. The second plate 180 is attached with the second track roller frame 136 such that the opening 182 of the second plate 180 aligns with the opening 164 of the second track roller frame 136. Also, in the assembled position of the second plate 180, the holes 184 formed in the second plate 180 are made to align with the holes 166 formed in the lower plate 150 of the second track roller frame 136.

The first plate 172 may be secured to the second plate 180 and the second track roller frame 136 by the fasteners 176 such that the second plate 180 is sandwiched between the first plate 172 and the second track roller frame 136. For securing the first plate 172 with the second plate 180 and the second track roller frame 136, the first plate 172 is arranged in such a manner that the holes 178 formed into the first plate 172 are aligned with the holes 184 formed in the second plate 180. The fasteners 176 are inserted though the holes 178 of the first plate and the holes 184 of the second plate 180 and are coupled to the second track roller frame 136. The holes 166 formed in the second track roller frame 136 may include screw threads to engage with the screw threads of the fasteners 176. As a result, the first plate 172 and the second plate 180 are coupled with the outer surface 162 of the second track roller frame 136. The first plate 172 may be initially loosely coupled with the second track roller frame 136 and the second plate 180 so that the first plate 172 can move relative to the second plate 180.

The resilient pad 174 may be inserted though the opening 182 of the second plate 180 and the opening 164 of the second track roller frame 136. The resilient pad 174 is positioned such that the first end surface 186 contacts the outer surface 158 of the first track roller frame 134 and the second end surface 188 contacts the first plate 172. Thereby, in an assembled position of the resilient pad 174, a portion of the resilient pad 174 resides between the outer surface 158 of the first track roller frame 134 and the inner surface 160 of the second track roller frame 136, while a remaining portion of the resilient pad 174 may extend between the first plate 172 and the outer surface 162 of the second track roller frame 136.

Further, the shim unit 190, with a desired combined thickness, may be inserted between the second plate 180 and the first plate 172 such that the shim unit 190 surrounds the resilient pad 174. After inserting the shim unit 190, the fasteners 176 are tightened such that the gap is reduced or eliminated between the upper plate 140 of the first track roller frame 134 and the upper plate 148 of the second track roller frame 136. A desired gap between the upper plate 140 of the first track roller frame 134 and the upper plate 148 of the second track roller frame 136 is achieved by selecting an appropriate combined thickness of the shim unit 190. The combined thickness of the shim unit 190 may be achieved by either varying the number of the shims 192, by varying the thickness of the shims 192, or by a combination of any of these two options.

As the fasteners 176 are tightened, the resilient pad 174 moves inward between the first track roller frame 134 and the second track roller frame 136, and pushes the first track roller frame 134 to adjust the gap 168 between the first track roller frame 134 and the second track roller frame 136. As the resilient pad 174 pushes the first track roller frame 134, the gap 168 between the upper plate 140 of the first track roller frame 134 and the upper plate 148 of the second track roller frame 136 is reduced.

During operation, the track type machine 100 moves over a worksite and performs a desired work. The movement of the track type machine 100 may cause wear of the first track roller frame 134 and/or the second track roller frame 136. Also, on several occasions during movement, the first track roller frame 134 may be extended or retracted relative to the second track roller frame 136 to adjust a tension in the endless belt 118. The relative movement between the first track roller frame 134 and the second track roller frame 136 may also cause wear of the first track roller frame 134 and/or the second track roller frame 136. Due to such wear, the gap 168 between the first track roller frame 134 and the second track roller frame 136 may increase.

Therefore, the gap 168 between the first track roller frame 134 and the second track roller frame 136 is readily adjusted. To adjust or reduce the gap 168, an operator may initially loosen the fasteners 176 and then remove one or more shims 192 arranged between the first plate 172 and the second plate 180. Alternatively, the operator may replace the one or more shims 192 arranged between the first plate 172 and the second plate 180 by one or more shims of a different thickness. In an embodiment, to reduce the gap 168, the operator may replace the one or more shims 192 by one or more shims of lower or reduced thickness. The operator may tighten the fasteners 176, which urges the resilient pad 174 to move and push the first track roller frame 134 towards the second track roller frame 136. As a result, the gap 168 between the first track roller frame 134 and the second track roller frame 136 is reduced. A reduction in the gap 168 is achieved by varying a combined thickness of the shim unit 190 arranged between the first plate 172 and the second plate 180.

What is claimed is:

1. A track roller frame assembly for a track type machine, comprising:
    a first track roller frame,
    a second track roller frame, the first track roller frame slidably received in the second track roller frame, the second track roller frame having an outer surface and an opening; and
    an assembly for adjusting a gap between the first track roller frame and the second track roller frame, the assembly for adjusting the gap including:
        a first plate coupled to the outer surface of the second track roller frame;
        a resilient pad extending through the opening of the second track roller frame and abutting the first plate and the first track roller frame; and
        one or more shims arranged between the first plate and the second track roller frame.

2. The track roller frame assembly of claim 1, wherein the gap between the first track roller frame and the second track roller frame is adjusted by varying a number of the one or more shims.

3. The track roller frame assembly of claim 1, wherein the gap between the first track roller frame and the second track roller frame is reduced by removing at least one of the one or more shims.

4. The track roller frame assembly of claim 1, wherein the gap between the first track roller frame and the second track roller frame is adjusted by varying a thickness of at least one of the one or more shims.

5. The track roller frame assembly of claim 1, wherein the gap between the first track roller frame and the second track roller frame is reduced by replacing at least one of the one or more shims with one or more shims of lower thickness.

6. The track roller frame assembly of claim 1 further comprising a second plate disposed between the outer surface of the second track roller frame and the first plate.

7. A track type machine, comprising:
    a main frame; and
    an undercarriage coupled to the main frame, the undercarriage including a track roller frame assembly comprising:
        a first track roller frame;
        a second track roller frame, the first track roller frame slidably received in the second track roller frame, the second track roller frame having an outer surface and an opening; and
        an assembly for adjusting a gap between the first track roller frame and the second track roller frame, the assembly for adjusting the gap including:
            a first plate coupled to the outer surface of the second track roller frame;
            a resilient pad extending through the opening of the second track roller frame and contacting the first track roller frame and the first plate; and
            one or more shims arranged between the first plate and the second track roller frame.

8. The track type machine of claim 7, wherein the gap between the first track roller frame and the second track roller frame is adjusted by varying a number of the one or more shims.

9. The track type machine of claim 7, wherein the gap between the first track roller frame and the second track roller frame is reduced by removing at least one of the one or more shims.

10. The track type machine of claim 7, wherein the gap between the first track roller frame and the second track roller frame is adjusted by varying a thickness of at least one of the one or more shims.

11. The track type machine of claim 7, wherein the gap between the first track roller frame and the second track roller frame is reduced by replacing at least one of the one or more shims with one or more shims of lower thickness.

12. The track type machine of claim 7 further comprising a second plate disposed between the outer surface of the second track roller frame and the first plate.

13. A track roller frame assembly for a track type machine, comprising:
    a first track roller frame,
    a second track roller frame, the first track roller frame slidably received in the second track roller frame, the second track roller frame having an outer surface and an opening; and
    an assembly for adjusting a gap between the first track roller frame and the second track roller frame, the assembly for adjusting the gap including:
        a first plate coupled to the outer surface of the second track roller frame;

a resilient pad extending through the opening of the second track roller frame and abutting the first plate and the first track roller frame;

a second plate disposed between the outer surface of the second track roller frame and the first plate; and one or more shims arranged between the first plate and the second plate, wherein a combined thickness of the one or more shims arranged between the first plate and the second plate is varied to adjust the gap between the first track roller frame and the second track roller frame.

14. The track roller frame assembly of claim 13, wherein the combined thickness of the one or more shims is varied by varying a number of the one or more shims.

15. The track roller frame assembly of claim 13, wherein the combined thickness of the one or more shims is varied by replacing at least one of the one or more shims with one or more shims of different thickness.

* * * * *